(No Model.)

B. COLLINS.
REVOLVING SULKY HAY RAKE.

No. 332,055. Patented Dec. 8, 1885.

WITNESSES:
Chas Nida
C. Sedgwick

INVENTOR:
B. Collins
BY Munn & Co
ATTORNEYS.

UNITED STATES PATENT OFFICE.

BYRON COLLINS, OF GALION, OHIO.

REVOLVING SULKY HAY-RAKE.

SPECIFICATION forming part of Letters Patent No. 332,055, dated December 8, 1885.

Application filed May 21, 1884. Serial No. 132,317. (No model.)

*To all whom it may concern:*

Be it known that I, BYRON COLLINS, of Galion, in the county of Crawford and State of Ohio, have invented a new and useful Improvement in Revolving Sulky Hay-Rakes, of which the following is a full, clear, and exact description.

Reference is to be had to the accompanying drawings, forming a part of this specification, in which similar letters of reference indicate corresponding parts in both the figures.

Figure 1:
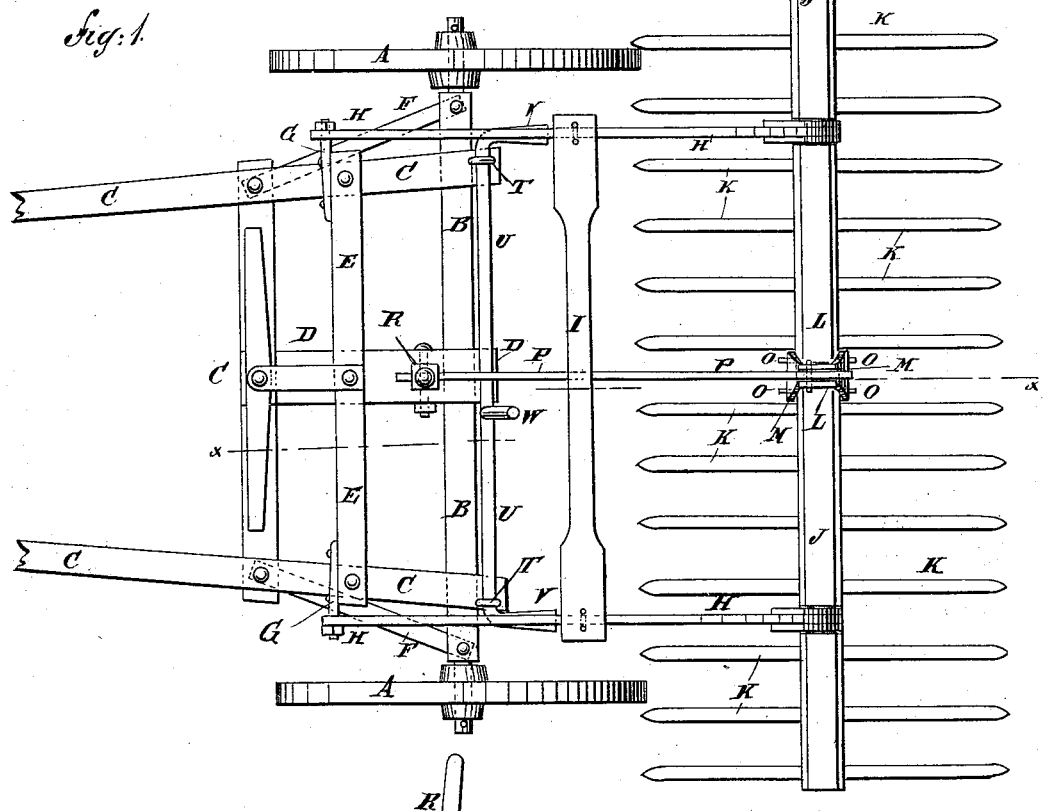
Figure 2:
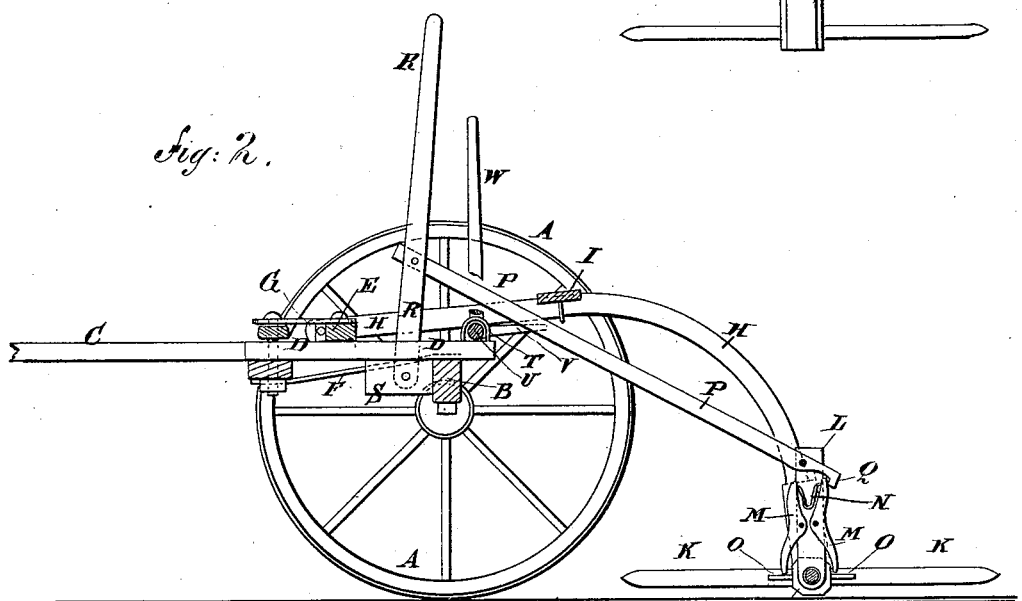

Figure 1 is a plan view of my improvement. Fig. 2 is a sectional side elevation of the same, taken through the line $x$ $x$, Fig. 1.

The object of this invention is to promote convenience in operating and controlling revolving sulky hay-rakes.

The invention consists in the combination of parts, including their construction, substantially as hereinafter fully set forth, and pointed out in the claim.

A represents the wheels, to the axle B of which are rigidly attached the thills C. To the center of the axle B and to the center of the cross-bar of the thills C are attached the ends of the bar D, to the middle part of which and to the thills C is attached a second cross-bar, E. The thills C are strengthened against side strain by the braces F, the forward ends of which are attached to the said thills, and their rear ends are attached to the axle B.

To the end parts of the cross-bar E are attached gudgeons G, the ends of which project beyond the thills C, and to them are pivoted the forward ends of the draw-bars H of the rake. The draw-bars H are kept at the proper distance apart by a cross-bar, I, the ends of which are secured to the middle parts of the said draw-bars. The rear parts of the draw-bars H are curved downward, and their rear ends are connected with the rake-head J by bearing-straps or other suitable means. The rake-head J is provided with teeth K in the ordinary manner. The middle part of the rake-head J revolves in bearings in the lower ends of two parallel standards, L, to and between the middle parts of which are pivoted two lever pawls or catches, M. The upper ends of the pawls M are held apart by the V-spring N, interposed between them. The lower ends of the pawls M project upon the front and rear sides of the rake-head J, so as to engage with the projecting ends of a pair of pins, O, passed, through the said rake-head parallel with the teeth K.

To and between the upper ends of the standards L is pivoted the connecting-bar P, at a little distance from its rear end.

Upon the lower side of the rear end of the bar P is formed a projection or shoulder, Q, to engage with the upper end of the rear pawl M, as shown in Fig. 2. The forward end of the bar P is pivoted to the lever R, which passes down through a slot in the bar D, and is pivoted at its lower end to a bearing-block, S, attached to the lower side of the said bar D.

To bearings T, attached to the upper sides of the rear ends of the thills C, is journaled a rod, U, upon the ends of which are formed, or to them are rigidly attached, parallel arms V, in such positions as to be beneath the draw-bars H of the rake. To the middle part of the rod U is rigidly attached an arm, W, to serve as a lever for operating the said rod U. When the upper end of the lever R is moved forward, the upper ends of the standards L are drawn forward, causing the forward pawl M to force the forward ends of the pins O downward, so that the forward ends of the rake-teeth K will engage with the ground and revolve the rake-head, discharging the collected hay. As the bar P moves forward, the shoulder Q of the said bar engages with and draws forward the upper end of the rear pawl M, swinging the lower end of the said pawl off the rear ends of the pins O, and allowing the rake-head to be revolved by the contact of the forward ends of the rake-teeth K with the ground, as hereinbefore described. As the rake-head revolves, the rear pins O strike against, push forward, and pass the lower end of the forward pawl M, and the forward pins O strike against the lower end of the rear pawl M, so that the said rake can only make half a revolution. By drawing the lever R to the rearward the rake-head will be turned to raise the forward ends of the rake-teeth, so that the rake can pass over obstructions readily.

When the rake is to be taken from one place to another, the upper end of the lever U is pushed forward, which forces the arms V against the lower sides of the draw-bars H and raises the rake-head J K from the ground. By operating the lever U, when the rake-teeth K are in a vertical position, the labor of raising the rake-head from the ground will be avoided.

Having thus described my invention, I claim as new and desire to secure by Letters Patent—

The combination, with the rake-head J K and the sulky-frame, of the standards L, the pawls M, arranged to straddle the rake-head, the spring N, interposed between the upper arms of said pawls, the pins O, projecting from the front and rear sides of the rake-head, the connecting-bar P, having a shoulder, Q, upon its lower rear end, and the lever R, substantially as and for the purpose set forth.

BYRON COLLINS.

Witnesses:
 JUDSON MANN,
 R. W. JOHNSTON.